Dec. 20, 1960 H. W. PATTON 2,965,834

TRANSISTOR-CONTROLLED MAGNETIC AMPLIFIER

Filed Sept. 13, 1956

PRIOR ART

INVENTOR.
HENRY W. PATTON
BY Moody and Harsha

ATTORNEYS

Patented Dec. 20, 1960

2,965,834

TRANSISTOR-CONTROLLED MAGNETIC AMPLIFIER

Henry W. Patton, Cedar Rapids, Iowa, assignor to Collins Radio Company, Cedar Rapids, Iowa, a corporation of Iowa Filed Sept. 13, 1956, Ser. No. 609,721

2 Claims. (Cl. 323—89)

This invention relates to magnetic amplifiers and more particularly to the control of magnetic amplifiers which are of the self-saturating type.

This invention utilizes transistors to control a magnetic core. Transistors have been used in the control of magnetic amplifier circuits previously, but major difficulties have been associated with these circuits. These difficulties are: changes in the performance characteristics and the resultant changes in the output levels due to temperature, voltage, and life instability of the transistors. Voltage, life, and temperature instability in transistors are particularly undesirable when the transistors are incorporated in magnetic amplifier circuits using core materials having generally a rectangular hysteresis loop. These instabilities are particularly noticeable if a fifty percent nickel-iron grain-oriented alloy is used in the reactor core since this particular core material requires an almost constant current for resetting the reactor. This invention provides a magnetic amplifier circuit which minimizes the instabilities of the transistors. Consequently, a two-stage magnetic amplifier circuit may be controlled by one transistor with the transistor elements being interchangeable without regard to variations from the nominal transistor operating characteristics.

It is a feature of this invention that a magnetic amplifier circuit which is controlled by a transistor is still relatively insensitive to line voltage changes, frequency variations, temperature variations, and life changes in the transistors used.

It is an object of this invention to provide a high performance magnetic amplifier circuit which has a phase time response and an exceedingly large power gain. It is a further object of this invention to provide a magnetic amplifier circuit which is capable of delivering either alternating current or direct current outputs. It is a still further object of this invention to provide a magnetic amplifier circuit which is capable of accepting either an alternating current or a direct current input signal. It is another object of this invention to provide a magnetic amplifier circuit wherein a transistor controls more than one output stage of the amplifier.

It is yet another object of this invention to provide a magnetic amplifier circuit which is economical and simple to construct and maintain.

These and other objects of this invention will become apparent when the following description is read in conjunction with the accompanying drawings, in which Figure 1 is a schematic diagram of a magnetic amplifier of the single-ended type controlled by a grounded-base transistor;

Figure 1:
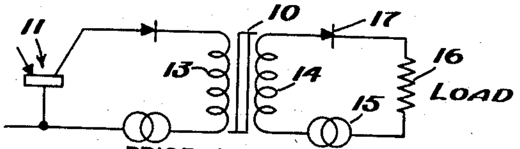
PRIOR ART FIG. 1

Referring now specifically to Figure 1, control and output circuits for the core of a magnetic amplifier are depicted. The core of the saturable reactor 10 has a plurality of windings thereon and is composed of any of the well-known magnetic amplifier materials having essentially rectangular hysteresis loops. The control of the core saturation is effected by the transistor 11 which is connected in a grounded-base fashion well known in the art. If the transistor 11 has a high resistance due to the biasing of the transistor by the input signal, then reset current will not flow through the control winding 13. Under these conditions, the reactor core 10 will have a maximum output on the following half-cycle. However, if the transistor has a low impedance value due to the polarity of the bias applied by the input signal, then maximum current will flow in the control windings, applying maximum reset voltage to the core of the reactor. In this instance the output signal from the reactor core on the next half-cycle will be a minimum. The output winding 14 and the voltage source 15, the load 16, and the diode 17 comprise the output circuit of the saturable reactor or magnetic amplifier.

Figure 2:
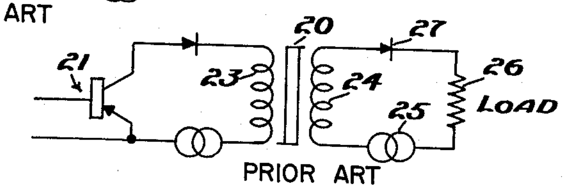
Figure 2 is a schematic diagram of a similar magnetic amplifier controlled by a grounded-emitter transistor.

Figure 2 is a depiction of a transistor control of a magnetic amplifier of the single-ended type with a grounded-emitter transistor. This circuit operates in substantially the same manner with the polarity of the bias provided by the input signal to the transistor 21 controlling the current flow in the control winding 23 and the reset value of the reactor core element 20. The output circuit is comprised of the output winding 24, the alternating voltage source 25, the load 26, and the diode 27 in exactly the same manner as in Figure 1.

Figures 1 and 2 are magnetic amplifier circuits using transistor controls which are well known in the art. As has been previously stated, these circuits have major difficulties associated with them; namely, changes in performance due to changes in the operating characteristics of the transistors associated therewith. These circuits have not been designed so that either of the transistors 11 and 21 may be replaced without readjusting the remainder of the circuitry.

If the typical characteristics of grounded-emitter and grounded-base transmitters are observed, it will be immediately seen that if the transistors are saturated for reasonable values of current, the effective voltage drop across the transistor is very small. It may be also observed that if no input signal is applied to the transistor, then the collector will normally have a very high impedance and the voltage drop in any associated circuitry will be substantially across the transistor. The magnetic amplifier circuits such as shown in Figures 1 and 2 have normally operated the transistors in intermediate regions between no signal and saturation. The transistors have been utilized chiefly as a variable resistance. This variation of the resistance with temperature abets other changing characteristics of the transistor and makes the circuits more unstable.

Consequently, this invention employs a switching mode of operation within the transistor so as to alleviate the adverse effects of these varied parameters.

Figures 3, 4:
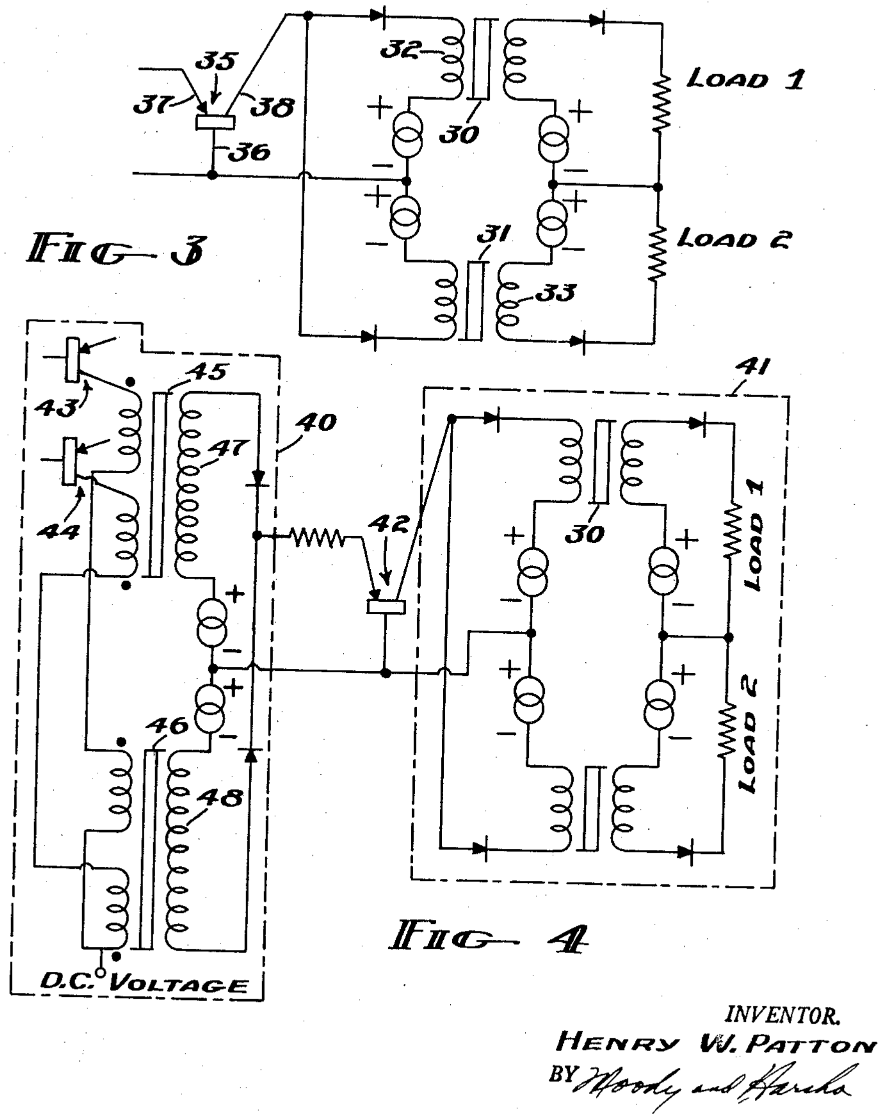
Figure 3 is a schematic diagram of a magnetic amplifier having two output stages controlled by one transistor.
Figure 4 is a schematic diagram of a magnetic amplifier circuit having the output controlled by a transistor with the input signals to the transistor controlled by a separate magnetic amplifier.

Figure 3 is a schematic diagram showing a transistor control of two output stages of a magnetic amplifier which is well known in the art. In Figure 3, the upper and lower halves of the magnetic amplifier comprising, respectively, the saturable reactors 30 and 31 are made to operate alternately, that is, when the upper core, or core 30, is resetting through its winding 32, the lower core, or core 31, is firing through its output winding 33. The elements in this two-stage amplifier are well-known in the art and will not be described further herein, but consist of voltage sources, load resistances, and unilateral conduction devices so arranged that the firing and resetting cycles of the cores are alternated. In the circuit of Figure 3, the reset current for both halves of the magnetic amplifier flows through the controlling transistor 35 with its base 36, its emitter 37, and its collector 38. This is a grounded-base transistor but as shown in Figures 1 and 2, other forms of the transistor control may be substituted without substantially changing the results. If the input signal to the transistor is properly pulsed, both reactors or either one of the reactors of the magnetic amplifier may be saturated, thereby controlling the deliverance of power to either one or both of the amplifier loads. This transistor 35 is effectively time-shared by the two amplifier halves so that control by the transistor may be exercised over either half of the amplifier without disturbing the operation of the other half of the amplifier.

If a direct current signal is fed into the input lead of the transistor, the magnetic amplifier circuit will operate erratically due to the variations previously described. However, if we apply input signals which are pulsed in proper synchronization with the basic carrier frequency of the magnetic amplifier, control of the magnetic amplifier is linear and relatively free from environmental changes of the transistor. If these pulse signals gate the transistor on a linear time basis the output signals will not be linear. The pulsed input signals would be based on a normal sinusoidal supply voltage. The non-linear output signals result because the output of a magnetic amplifier is not a linear function of phase-angle, but is rather a function of the volt-second area. A linear amplifier characteristic results from pulsing the transistor of this invention on a volt-second basis rather than a phase-angle basis. This required pulse on a volt-second basis is generated in a portion of the circuit of Figure 4. Figure 4 is a transistor-controlled magnetic amplifier circuit where the output signals are essentially independent of the parameters of the controlling transistor.

Referring now specifically to Figure 4, the preamplifier stage 40 operates to control the transistor-controlled amplifier stage 41. The amplifier stage 41 and the transistor are the same circuit and operate in the same manner as the circuit of Figure 3. The pulses required to control the transistor 42 and the linearity of the output signals are developed in the preamplifier stage 40. Referring now specifically to the preamplifier stage 40 of Figure 4, if zero control signal is applied to the transistors 43 and 44, the magnetic cores 45 and 46 will be driven to saturation by the current flow in the output windings 47 and 48 and will subsequently fire over substantially all of the 180 degrees of the firing cycle. The pulses from the output windings 47 and 48 then control the transistor 42 on a volt-second time-gated basis so that the transistor has a relatively low impedance at predetermined intervals. With the transistor 42 biased so as to have a relatively low impedance substantially all of the bias from the output stage is used to reset the cores of the controlled amplifier stage 41. This, then, results in a minimum output signal from the controlled amplifier stage. However, if we apply an input signal to transistors 43 and 44 such that the reactor 45 is reset, then on the following half-cycle the reactor 45 will absorb part of the resultant volt-second signal in its output winding. Thus, an output pulse is delivered to the transistor 42 during only the latter portion of the firing cycle of the core 45. The pulse from the core 45 is delivered to the transistor 42, thereby lowering the internal impedance of the transistor. This results in the resetting of the magnetic reactor 30. Inasmuch as the first portion of the pulse delivered by the reactor 45 to the transistor 42 has been absorbed by the winding 47, the transistor 42 exhibits a high impedance during the first portion of the reset cycle. This high impedance results in the reactor 30 of the output stage not being fully reset so that a power pulse is obtained on the following half-cycle to the associated load resistor. The area of this power pulse applied to the load resistor will be a replica of the area of the pulse which resets reactor 30. Thus the impedance of the transistor 42, which is controlled by pulses generated by the control stage, determines the magnitude of the output signal. It is noteworthy that this transistor 42 also effectively isolates the input stage or control stage from the output stage and thereby eliminates many of the disadvantages which are well known in the cascading of two magnetic amplifiers directly. This transistor control also provides a substantial amount of gain between stages, with no time delay involved.

In one particular model of this invention which has been caused to be constructed, 100 microwatts of input power resulted in 500 watts of power output. The time response of the entire invention was but one full cycle of the supply carrier frequency.

Although this invention has been described with respect to a particular embodiment thereof, it is not to be so limited, as changes and modifications may be made therein which are within the full intended scope of the invention, as defined by the appended claims.

What is claimed is:

1. A preamplifier for a transistor controlled magnetic amplifier comprising, a first core having first and second oppositely phased primary windings and a secondary winding, a second core having first and second primary windings and a secondary winding, one end of said first primary winding of said first core serially connected to a D.-C. terminal through a similarly phased primary winding of said second core, one end of said second primary winding of said first core serially connected to said D.-C. terminal through the remaining primary winding of said second core, said remaining primary winding phased similarly to said second primary winding of said first core, first and second transistors having their outputs respectively connected to the remaining ends of said first and second primary windings of said first core, first and second A.-C. generators having a common frequency, one end of the secondary winding of said first core, said first and second generators and one end of the secondary winding of said second core being serially connected in that order, the common junction between said generators forming a first output terminal, a second output terminal, a first diode connected between the remaining end of said secondary winding of said first core and said second output terminal, a second diode connected between the remaining end of said secondary winding of said second core and said second output terminal, said first and second diodes poled such that each secondary winding will provide the same output voltage polarity at said first and second output terminals, whereby an output voltage will appear at the output of said preamplifier during each half cycle of said A.-C. generator possessing a volt-second time relationship which is determined by the ratio of the voltages applied from said first and second transistors to said first and second windings of said first core.

2. A cascaded magnetic amplifier system comprising a preamplifier having first and second saturable reactors therein, each of said saturable reactors having first and second primary windings oppositely poled and a secondary winding, the first and second primary windings of said first saturable reactor having one end serially connected respectively with the first and second primary windings of said second saturable reactor, the remaining end of said first and second primary windings of said first saturable reactor connected to an input means, the remaining end of the first and second primary windings of said second saturable reactor connected to a bias voltage terminal, said secondary windings connected in a series loop comprising, a first output terminal, a first diode, the secondary winding of said first saturable reactor, a first A.-C. generator, a second A.-C. generator, the secondary winding of said second saturable reactor, a second diode oppositely poled from said first diode and said first output terminal, the common junction between said first and second generators connected to a second output terminal, a gated transistor having at least an emitter, collector, and base, the emitter of said transistor connected to said first output terminal, the base of said transistor connected to said second output terminal, an output magnetic amplifier including third and fourth saturable reactors, each of said saturable reactors including at least a primary and a secondary, a first output loop from said gated transistor comprising a diode connected to said collector, said diode serially connected through the primary of said third saturable reactor through a third alternating-current generator to the base of said gated transistor, a second output loop comprising a second diode similarly poled to said first diode, said second diode serially connected from said collector to a primary of said fourth saturable reactor to a fourth A.-C. generator to the base of said gated transistor, the secondaries of said third and fourth saturable reactors operably connected to a first and second load means respectively whereby when an unbalanced voltage is present at the input of the first and second primary windings of said first saturable reactor, the output of said first and second saturable reactors will cause said gated transistor to selectively gate the first or second output loops of said output magnetic amplifier thereby varying the reset time and consequently the output of said magnetic amplifier in accordance with the degree of unbalance at the input of said first saturable reactor.

References Cited in the file of this patent

UNITED STATES PATENTS

| | | |
|---|---|---|
| 2,740,086 | Evans et al. | Mar. 27, 1956 |
| 2,770,737 | Ramey | Nov. 13, 1956 |
| 2,809,343 | Pittman | Oct. 8, 1957 |
| 2,819,352 | Houck | Jan. 7, 1958 |
| 2,824,697 | Pittman et al. | Feb. 25, 1958 |
| 2,824,698 | Van Nice et al. | Feb. 25, 1958 |
| 2,870,268 | Mamon | Jan. 20, 1959 |